(12) United States Patent
Henry et al.

(10) Patent No.: US 12,162,211 B2
(45) Date of Patent: Dec. 10, 2024

(54) METHODS OF ADHERING FUSED DEPOSITION MODELING 3D PRINTED ELEMENTS ON FABRICS

(71) Applicant: Kimberly-Clark Worldwide, Inc., Neenah, WI (US)

(72) Inventors: Samuel B. Henry, Neenah, WI (US); Walter G. Bauer, Neenah, WI (US)

(73) Assignee: KIMBERLY-CLARK WORLDWIDE, INC., Neenah, WI (US)

( * ) Notice: Subject to any disclaimer, the term of this patent is extended or adjusted under 35 U.S.C. 154(b) by 0 days.

(21) Appl. No.: 17/789,256

(22) PCT Filed: Jan. 31, 2020

(86) PCT No.: PCT/US2020/016197
§ 371 (c)(1),
(2) Date: Jun. 27, 2022

(87) PCT Pub. No.: WO2021/154292
PCT Pub. Date: Aug. 5, 2021

(65) Prior Publication Data
US 2023/0066967 A1      Mar. 2, 2023

(51) Int. Cl.
*B29C 64/118*     (2017.01)
*B32B 5/02*     (2006.01)
(Continued)

(52) U.S. Cl.
CPC ............ *B29C 64/118* (2017.08); *B32B 5/024* (2013.01); *B33Y 10/00* (2014.12); *B33Y 80/00* (2014.12);
(Continued)

(58) Field of Classification Search
CPC ... B29C 64/118; B29C 64/295; B29C 64/188; B33Y 10/00; B32B 5/024
See application file for complete search history.

(56) References Cited

U.S. PATENT DOCUMENTS 6,287,641 B1    9/2001  Ostendorf et al.
7,014,735 B2    3/2006  Kramer et al.
(Continued)

FOREIGN PATENT DOCUMENTS

EP    0972876 A2    1/2000
EP    2874798 A2    5/2015
(Continued)

OTHER PUBLICATIONS

Sanatgar, Razieh Hashemi et al., Investigation of the adhesion properties of direct 3D printing of polymers and nanocomposites on textiles: Effect of FDM printing process parameters; Applied Surface Science; vol. 403, 2017, pp. 551-563.
(Continued)

*Primary Examiner* — Nahida Sultana
*Assistant Examiner* — Mohamed K Ahmed Ali
(74) *Attorney, Agent, or Firm* — Armstrong Teasdale LLP (57) ABSTRACT

The present disclosure is directed to the use of additive manufacturing, and in particular, a fused deposition modeling (FDM) process, in the production of fabrics. More specifically, the present disclosure is directed to the use of additive manufacturing to fabricate three-dimensional elements on a fabric support structure. Also disclosed are methods for determining the spatial relationship between a fabric support structure and a print head used in additive manufacturing.

18 Claims, 2 Drawing Sheets

(51) Int. Cl.
   *B33Y 10/00* (2015.01)
   *B33Y 80/00* (2015.01)
   *B29K 101/12* (2006.01)
   *B29L 31/00* (2006.01)

(52) U.S. Cl.
   CPC ..... *B29K 2101/12* (2013.01); *B29L 2031/726* (2013.01); *B32B 2262/02* (2013.01)

(56) References Cited

U.S. PATENT DOCUMENTS

| | | | |
|---|---|---|---|
| 7,914,649 | B2 | 3/2011 | Ostendorf et al. |
| 8,192,584 | B2 | 6/2012 | Murakami |
| 10,280,563 | B2 | 5/2019 | Burazin et al. |
| 2005/0102763 | A1 | 5/2005 | Eagles |
| 2015/0102526 | A1 | 4/2015 | Ward et al. |
| 2015/0230562 | A1 | 8/2015 | Jones et al. |
| 2017/0197371 | A1 | 7/2017 | Fetfatsidis et al. |
| 2019/0381783 | A1* | 12/2019 | Bihari ................... B29C 64/118 |

FOREIGN PATENT DOCUMENTS

| | | |
|---|---|---|
| KR | 101654635 B1 | 9/2016 |
| KR | 101987211 B1 | 6/2019 |
| WO | 2014015037 A2 | 1/2014 |

OTHER PUBLICATIONS

Karl Mayer Textile Makerspace, "Printing directly on a textile during textile production"; available at https://www.karlmayer.com/textile-makerspace/en/innovation/rapid-textil/; last visited Jun. 10, 2022; 5 pp.

PCT International Search Report and Written Opinion for Patent Application PCT/US2020/016197; mailed Oct. 27, 2020; 10 pp.

PCT International Preliminary Report on Patentability for patent application PCT/US2020016197 mailed Jul. 1, 2022; 11 pp.

Austrian Search Report issued for Application No. 9428/2020, dated Oct. 9, 2023 (1 page).

* cited by examiner

METHODS OF ADHERING FUSED DEPOSITION MODELING 3D PRINTED ELEMENTS ON FABRICS

FIELD OF THE DISCLOSURE

The present disclosure is directed to the use of additive manufacturing, and in particular, a fused deposition modeling (FDM) process, in the production of fabrics. More specifically, the present disclosure is directed to the use of additive manufacturing to fabricate three-dimensional elements on a fabric support structure. Also disclosed are methods for determining the spatial relationship between a fabric support structure and a print head used in additive manufacturing.

BACKGROUND OF THE DISCLOSURE

In the manufacture of paper and fabric materials, particularly absorbent products, there is a continuing need to improve the product appearance. Absorbent tissue products are frequently embossed to impart consumer preferred visually appealing textures or decorative lines. In some instances, textures or decorative lines on tissue products may be achieved using additive or layered manufacturing processes, such as 3D printing. Such processes may be used to produce products having extruded or printed thereon a three-dimensional element that forms either discrete or continuous patterns on the fabric. However, printed or extruded 3D elements do not always adhere well to the underlying fabrics. Additionally, printing 3D elements on fabrics may damage, and thus weaken, the fabric if the printing occurs too rapidly. As a result, traditional 3D printing techniques may be time consuming, and result in inadequate adherence of the 3D element to the fabric.

As such, there remains a need for fabric/paper based products and methods of producing such products that have visually discernable 3D elements that can be rapidly produced by additive manufacturing, such as 3D printing, without damaging the fabric, and where the printed elements adequately adhere to the fabric.

BRIEF DESCRIPTION OF THE DISCLOSURE

In one aspect, the present disclosure is directed to a method of additively manufacturing a fabric, the method comprising: providing a support structure having a top surface, a bottom surface opposite to the top surface, an x-y plane, and a thickness extending from the bottom surface to the top surface in a z-direction perpendicular to the x-y plane, the support structure comprising a plurality of filaments and voids between the filaments; forming a platform layer on the support structure by dispensing onto the top surface of the support structure a flowable platform layer material from an extrusion head transported in the x and/or y directions over the top surface of the support structure, wherein at least a portion of the voids are filled with the flowable platform layer material; and forming at least one additional layer on the support structure by incrementally transporting the extrusion head in the z direction away from the top surface of the support structure, wherein at least a portion of the at least one additional layer contacts the platform layer.

In another aspect, the present disclosure provides a method of identifying a top of the support structure by: i) transporting an extrusion head over the top surface of a support structure in the x-y plane without contacting the support structure; and ii) while transporting the extrusion head over the top surface of the support structure, incrementally lowering the extrusion head in the z direction towards the top surface of the support structure until the filaments of the support structure begin to degrade.

In another aspect, the present disclosure is directed to a fabric comprising: a support structure having a top surface, a bottom surface opposite to the top surface, an x-y plane, and a thickness extending from the bottom surface to the top surface in a z-direction perpendicular to the x-y plane, the support structure comprising a plurality of filaments and voids between the filaments; a discontinuous platform layer comprising a platform layer material on the top surface of the support structure, wherein at least a portion of the voids are filled with the platform layer material; and at least one additional layer; wherein at least a portion of the at least one additional layer contacts the platform layer.

DEFINITIONS

As used herein, the term "fabric" refers to cloth or paper products comprising a plurality of filaments and voids between the filaments. The fabric may be a woven or non-woven material, and may include papermaking belts or products made from tissue webs (e.g., bath tissues, facial tissues, paper towels, wipes, (e.g., industrial, foodservice, or personal care wipes), napkins, medical pads, and the like). The fabric may be made from a variety of processes including, but not limited to, airlaid processes, wet-laid processes such as with cellulosic-based tissues or towels, hydroentangling processes, staple fiber carding and bonding, solution spinning, or an uncreped through air dried (UCTAD) process. The fabric may be made of a variety of materials, including natural fibers, synthetic fibers, or combinations thereof.

As used herein, the term "element" or "3D element" refers to a material extending in the z-direction from the plane of a support structure.

As used herein the term "continuous layer" refers to a layer (e.g., a platform layer) disposed on a support structure that extends without interruption throughout the support structure or across the entire top surface of the support structure.

As used herein the terms "discontinuous layer" refers to a layer applied as separate, unconnected elements disposed on a support structure. In one example, a plurality of discrete elements, such as dots and/or dashes for example, may be arranged so as to form a pattern.

As used herein "pattern" or "decorative pattern" refers to any non-random repeating design, figure, or motif. It is not necessary that the elements of the pattern form recognizable shapes, and a repeating design of the elements is considered to constitute a decorative pattern.

As used herein the term "aperture" refers to an opening disposed on one surface of a three-dimensional element as disclosed herein.

As used herein, the term "solid free form fabrication" (SFF) generally refers to the three-dimensional printing of material using any one of the well-known layer manufacturing processes, such as stereo lithography, selective laser sintering, inkjet printing, laminated object manufacturing, fused deposition modeling, laser-assisted welding or cladding, and shape deposition modeling. SFF typically involves representing a 3D object with a computer-aided design (CAD) geometry file, converting the design file into a machine control command and using the command to drive and control a part-building tool for building parts essentially point-by-point or layer-by-layer.

As used herein, the term "additive manufacturing" refers to manufacturing techniques that form a three-dimensional object or element by adding layer-upon-layer of material. Additive manufacturing processes include solid free form fabrication and fused deposition modeling processes.

As used herein, the term "3D printed" generally refers to a fused deposition modeling process (hereinafter abbreviated to FDM) as described in U.S. Pat. No. 5,121,329, the contents of which are hereby incorporated by reference in a manner consistent with the present disclosure, and generally employs a heated nozzle to melt and extrude out a material such as nylon, ABS plastic (acrylonitrile-butadiene-styrene) and wax. The build material is supplied into the nozzle in the form of a rod or filament.

The term "printing head" or "extrusion head", used interchangeably herein, mean the entire device for the conveying, melting and application of a filament in an extrusion-based 3D printing process.

As used herein, the term "woven" generally refers to a structure formed from a plurality of interconnected filaments. Woven refers to structures comprising a plurality of filaments that have been interconnected by weaving two or more filaments together, such as by interlacing in a repeating pattern, as well as structures made of a multiplicity of helical coils or links of filaments such as wire-link belts disclosed, for example, in U.S. Pat. No. 5,334,440.

DETAILED DESCRIPTION OF THE DISCLOSURE

The present disclosure is directed to the use of additive manufacturing, and in particular, SFF, such as a fused deposition modeling (FDM) process, in the production of fabrics. More specifically, the present disclosure is directed to the use of additive manufacturing to fabricate three-dimensional (3D) elements on a fabric support structure.

It has now been discovered that the use of additive manufacturing, and in particular FDM, in the production of fabrics having 3D elements or decorative patterns thereon, can be improved by first forming a platform layer on a fabric support structure prior to formation of additional layers of the 3D element. The platform layer advantageously provides a platform for the addition of subsequent layers without damaging or otherwise compromising the strength of the support structure, and thus allows for more rapid printing of subsequent layers. The platform layer also improves the adherence of FDM 3D elements to the surface of a fabric support structure by providing a surface for adherence of subsequent layers.

More specifically, the platform layer is formed by dispensing onto a surface of the support structure a flowable platform layer material from an extrusion head transported over a top surface of the support structure. The flowable platform layer material is of a sufficiently low viscosity to allow the flowable platform layer material to flow into void spaces present in the support structure. More specifically, upon contact with the support structure, the flowable platform layer material flows in and around the filaments that form the support structure and into the voids where it solidifies, thus taking the shape of the voids and encircling the filaments to mechanically secure the platform layer to the support structure. The additional layers that form the 3D element may then be printed onto the support structure and/or platform layer.

Thus, in one aspect, the present disclosure is directed to a method of additively manufacturing a fabric, the method comprising: providing a support structure having a top (i.e., extrusion head facing) surface, a bottom surface opposite to the top surface, an x-y plane, and a thickness extending from the bottom surface to the top surface in a z-direction perpendicular to the x-y plane, the support structure comprising a plurality of filaments and voids between the filaments; forming a first platform layer on the support structure by dispensing onto the top surface of the support structure a flowable platform layer material from an extrusion head transported in the x and/or y directions over the top surface of the support structure, wherein at least a portion of the voids are filled with the flowable platform layer material; and forming at least one additional layer on the support structure by incrementally transporting the extrusion head in the z direction away from the top surface of the support structure, wherein at least a portion of the at least one additional layer contacts the platform layer.

Support Structure

The support structure may be any fabric material comprising a plurality of filaments and voids between the filaments. The support structure may be, for example, a woven or non-woven material, and may include papermaking belts or products made from tissue webs (e.g., bath tissues, facial tissues, paper towels, wipes (e.g., industrial, foodservice, or personal care wipes), napkins, medical pads, and the like). The support structure may be made from a variety of processes including, but not limited to, airlaid processes, wet-laid processes such as with cellulosic-based tissues or towels, hydroentangling processes, staple fiber carding and bonding, and solution spinning. In one embodiment, the support structure is produced using an uncreped through air dried (UCTAD) process. Examples of such processes are known in the art, and described in, for example, U.S. Pat. Nos. 6,736,935; 6,887,348; and 6,953,516, which are herein incorporated by reference.

The support structure may be a single layer or multi-layer fabric. Examples of suitable support structures are described in, for example, WO 2019/028052 and US 2018/0209096, which are herein incorporated by reference to the extent they are consistent with the present disclosure.

The filaments (also referred to herein as "fibers") forming the support structure may be made from a variety of materials. For instance, the filaments may comprise a thermoplastic resin, a silicone rubber, or a non-silicone vulcanized rubber made from at least a majority by weight of fluoroelastomer having good heat and chemical resistance. Suitable thermoplastic resins which can be used include, but are not limited to, polyvinyl fluoride, polyvinylidene fluoride, polyvinyl chloride, polyethylene, polypropylene, polyethers, styrene-butadiene copolymers, polybutylenes, and the like. Other suitable thermoplastic film forming polymers include polyethylene ("PE"), polypropylene ("PP"), polyphenylene sulfide ("PPS"), polyimides, polyamides, polysulfones, polysulfides, cellulosic resins, polyarylate acrylics, polyarylsulfones, polyurethanes, epoxies, poly(amide-imides), copolyesters, polyethersulfones, polyetherimides, polyarylethers, and the like. In other instances the support structure may comprise a silicone rubber. In still other instances the support structure may comprise a fluoroelastomer layer bonded to a silicone rubber layer. In one embodiment, the support structure comprises polyphenylene sulfide.

The support structures of the present disclosure advantageously comprise voids between the filaments. As discussed herein, when dispensed, the flowable platform layer material enters and fills voids in the support structure and surrounds the support structure filaments. The flowable platform layer subsequently solidifies, and takes on the shape of the voids, thus locking the platform layer onto the support structure. As discussed hereinafter, the size of the voids and distribution of the voids in the support structure may affect the ability of the flowable platform layer material to enter the voids. To assist the platform layer material in filling the voids, in certain embodiments, it is desirable for the voids in the support structure to have a diameter of at least 100 µm. In one embodiment, the distance between the voids is about that of the extrusion width, or smaller.

Figure 1:
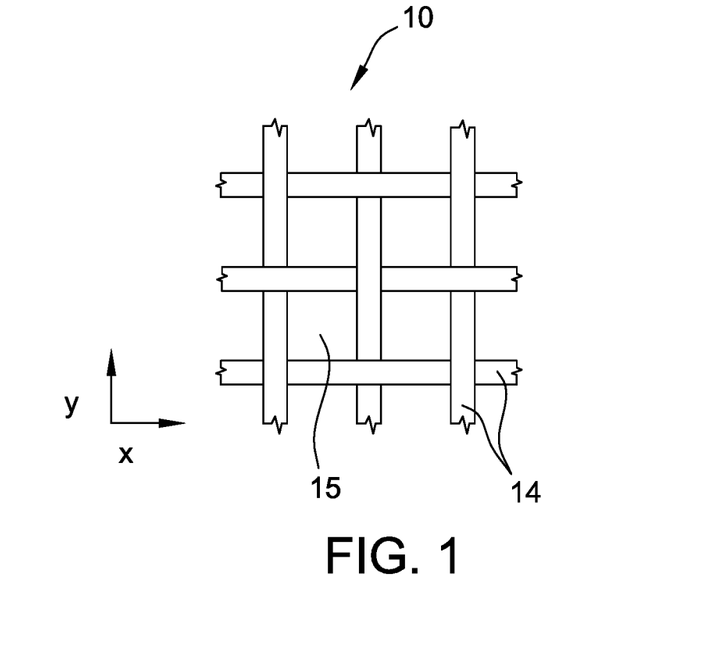
FIG. 1 is a fragmentary top plane view of a support structure of the present disclosure.

With reference to FIG. 1, depicted therein is a fragmentary top plane view of an exemplary support structure (10) (also referred to herein as a fabric or fabric support structure). Support structure (10) is in an x-y plane, and comprises a plurality of filaments (14) and voids (15) between the filaments. In embodiments where the support structure is a papermaking belt, the support structure (10) may have two principle dimensions—a machine direction ("MD"), which is the direction within the plane of the belt 10 parallel to the principal direction of travel of the fabric during manufacture and a cross-machine direction ("CD"), which is generally orthogonal to the machine direction. The support structure (10) is generally permeable to liquids and air. The support structure may be any fabric material comprising void spaces internal to or between the filaments forming the support structure. For instance, the support structure may be a woven or non-woven fabric. In one particularly preferred embodiment the support structure is a woven fabric.

Figure 2:
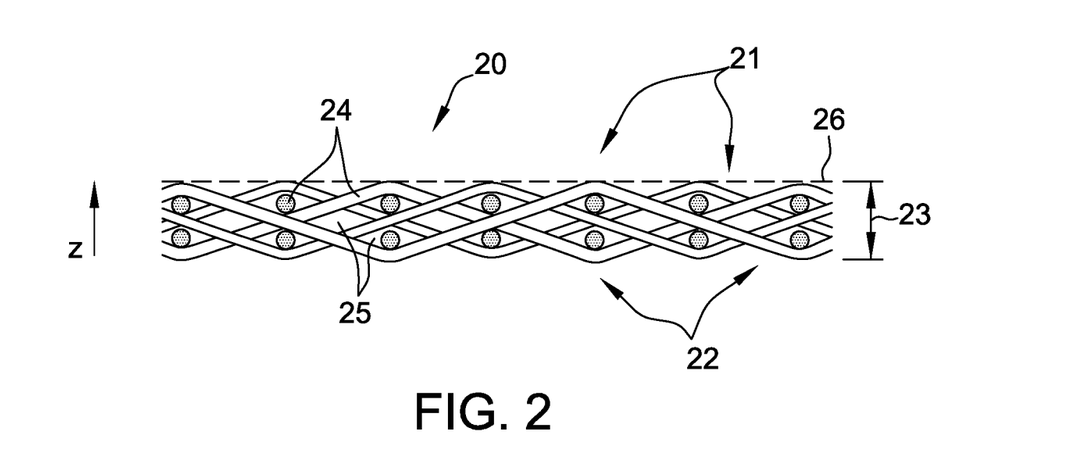
FIG. 2 is a cross-sectional view of a support structure of the present disclosure.

With reference to FIG. 2, depicted therein is a cross-sectional view of an exemplary woven support structure (20). Support structure (20) is in an x-y plane and has a top surface (21), a bottom surface opposite to the top surface (22), and a thickness (23) extending from the bottom surface to the top surface in a z-direction perpendicular to the x-y plane. Support structure (20) comprises a plurality of filaments (24) and voids (25) between the filaments. In one embodiment, the support structure may be substantially planar, or may have a three-dimensional surface defined by ridges. As depicted in FIG. 2, in one embodiment, the top surface (21) of support structure (20) has an uneven topography, with certain points of the filaments being higher than other points of the filaments. In one embodiment, the support structure (20) may be constructed so that the highest points of the filaments (24) are substantially coplanar and form a top (26) of the support structure.

Platform Layer

The material used to form the platform layer (also referred to herein as "platform layer material") may be any material that may be used in additive manufacturing processes, such as FDM. In particular, the platform layer material may be any material that can melt to a flowable state, and re-solidify in the voids in the support structure. Examples of suitable materials include thermoplastics, epoxies, other polymeric materials, and combinations thereof. In certain embodiments the platform layer comprises a thermoplastic such as, for example, a thermoplastic comprising from about 0.5 and 10 weight percent silicone and a base polymer selected from the group consisting of polyethersulfones, polyetherimides, polyphenylsulfones, polyphenylenes, polycarbonates, high-impact polystyrenes, polysulfones, polystyrenes, acrylics, amorphous polyamides, polyesters, nylons, PEEK, PEAK and ABS. In other embodiments the platform layer material is a polymeric material selected from the group consisting of PET (polyester), PPS (polyphenylene sulfide), PCTA (poly 1,4 cyclohexane dimethylene terephthalate), PEN (polyethylene naphthalate), PVDF (polyvinylidene fluoride), PEEK (polyetheretherketone), and combinations thereof. In one particular embodiment, the platform layer material comprises polyphenylene sulfide. In some embodiments, the platform layer material may further comprise various additives, such as carbon fibers, or other additives that improve processability or physical characteristics of the finished product.

In other embodiments, the platform layer material may include photo-curable and self-curing resins. Photocurable resins may include resins curable by UV curing, visible light curing, electron beam curing, gamma radiation curing, radiofrequency curing, microwave curing, infrared curing, or other known curing methods involving application of radiation to cure a resin. Suitable resins may also include those that may be cured via chemical reaction without the need for added radiation as in the curing of an epoxy resin, extrusion of an autocuring polymer such as polyurethane mixture, thermal curing, solidifying of an applied hotmelt or molten thermoplastic As discussed herein, the platform layer material is dispensed onto the support structure in a flowable state. When in a flowable state, the platform layer material is also referred to herein as the "flowable material" or the "flowable platform layer material". To obtain the flowable platform layer material, the platform layer material is heated to at least the melting point of the material prior to dispensing. The ability of the flowable platform layer material to fill the voids in the support structure may be affected by the diameter of the voids in the support structure, and the viscosity of the flowable platform layer material. In particular, it should be understood that the lower the viscosity of the flowable platform layer material, the more readily the flowable platform layer material will flow into voids in the support structure. In particular, lower viscosities are desirable when the void diameter or void volume is small. The flowable platform layer material will thus preferably have a viscosity sufficiently low to penetrate voids in the support structure to a sufficient depth such that, upon cooling, a mechanical tension is generated. In one particular embodiment, the flowable platform layer material will desirably have a viscosity sufficiently low to allow the flowable platform layer material to penetrate into the support structure to a depth of at least 50% of the thickness of the support structure.

The platform layer material may be heated to any temperature at which the material is flowable, including to at least the melting point of the material. In certain embodiments, it may be desirable to heat the platform layer material to a temperature above its melting point. In particular, dispensing the platform layer material onto the support structure at hotter temperatures allows the material to remain in a flowable state for longer periods of time, while minimizing the viscosity, which allows for easier filling of the voids in the support structure. Dispensing the platform layer material onto the support structure at hot temperatures may also help maximize adhesion between the flowable platform layer material and the filaments in the support structure. Thus, in certain embodiments, the platform layer material may be heated to at least 10° C., at least 20° C., at least 30° C., at least 40° C., at least 50° C., at least 60° C., at least 70° C., at least 80° C., at least 90° C., at least 100° C., at least 150° C., or at least 200° C. above the melting point of the material prior to dispensing as a flowable platform layer material on the support structure.

It is generally preferable that the temperature of the flowable platform layer material not be so high that the support structure is damaged (e.g., melted, burned, or otherwise degraded) when contacted with the flowable platform layer material. Thus, the platform layer material, support structure, and temperature to which the platform layer material is heated should be selected such that the platform layer material is in a flowable state when dispensed onto the support structure, but the support structure is not damaged (e.g., melted, burned, or otherwise degraded) when contacted with the flowable platform layer material. Because the support structure is not damaged by the methods of the present disclosure (e.g., melted or burned), the strength of the support structure (fabric) is not compromised during the printing process. In one particular embodiment, the platform layer material is heated to a temperature of at least the melting point of the platform layer material, but to no higher than the melting (or burning) point of the support structure. In one particular embodiment, the platform layer material and the support structure both comprise polyphenylene sulfide, and the platform layer material is heated to the melting point of polyphenylene sulfide (i.e., about 280° C.-285° C.) to obtain a flowable platform layer material, which is dispensed on the support structure.

It should be understood that it is also possible for a platform layer material heated to a temperature above the melting/burning point of the support structure to be dispensed on the support structure without damaging the support structure itself. In particular, the heating capacity of the support structure may be affected by factors other than the temperature of the flowable platform layer material and the melting/burning point of the support structure. For instance, the volume of platform layer material extruded per linear distance travelled by the extrusion head (greater volume extruded increases the amount of heat applied to the support structure), filament size (thinner filaments in support structure decrease the heat capacity of the support structure), and print speed (slower printing may result in greater heat transfer from the heated extrusion head, which may melt/burn the fabric) may all affect support structure integrity and the amount of heat the support structure can absorb without damage. Thus, in other embodiments, the platform layer material may be heated to temperature of at least the melting point of the platform layer material, and also above the melting (or burning) point of the support structure, so long as the support structure is not damaged by deposition of the flowable platform layer material thereon.

As discussed herein, it is desirable to maximize the penetration of the flowable platform layer material into the voids of the support structure. It has now been discovered that penetration of the flowable platform layer material into the voids of the support structure may be facilitated by dispensing the flowable platform layer material onto a heated support structure. By dispensing the flowable platform layer material onto a heated support structure, the flowable platform layer material does not cool as quickly, thus allowing a longer period of time for the flowable platform layer material to penetrate and fill the voids of the support structure prior to solidifying.

Thus, in another aspect, the methods of the present disclosure may further comprise heating the support structure prior to forming the platform layer. The support structure may be heated to any temperature at which the support structure is not damaged (e.g., melted or otherwise degraded). In one embodiment, the support structure is heated to a temperature of at least 70° C., or at least 80° C., at least 90° C., at least 100° C., at least 110° C., at least 120° C., at least 130° C., at least 140° C., at least 150° C., at least 180° C., at least 200° C., at least 220° C., at least 250° C., or at least 270° C. In one embodiment, the support structure is heated to a temperature below the melting point of the support structure, including 1° C., 2° C., 5° C., 10° C., 15° C., 20° C., 30° C., 40° C., 50° C., 60° C., 70° C., 80° C., 90° C., or 100° C. below the melting point of the support structure. The support structure may be heated using any suitable means known in the art for heating of fabric support structures. In one embodiment, the support structure is placed on a supporting plate or belt during formation of the 3D elements, and is heated by heating the plate or belt to the desired temperature. In one embodiment, the flowable platform layer material is not subjected to a cooling step following dispensing on the support structure, but instead is allowed to solidify at ambient temperatures.

In some embodiments, the platform layer extends to the top (extrusion head facing) surface of the support structure. In other embodiments, the platform layer extends in the z direction above the top surface of the support structure. Such an embodiment is illustrated, for example, in FIG. 3. It has now been discovered that extending the platform layer in the z direction above the top surface of the support structure may result in better adhesion of the additional layers, which form the 3D element, to the fabric. This may be achieved, for example, by dispensing the flowable platform layer material without the extrusion head contacting the support structure. Thus in another aspect, the extrusion head does not contact the top surface of the support structure when forming the platform layer.

Figure 3:
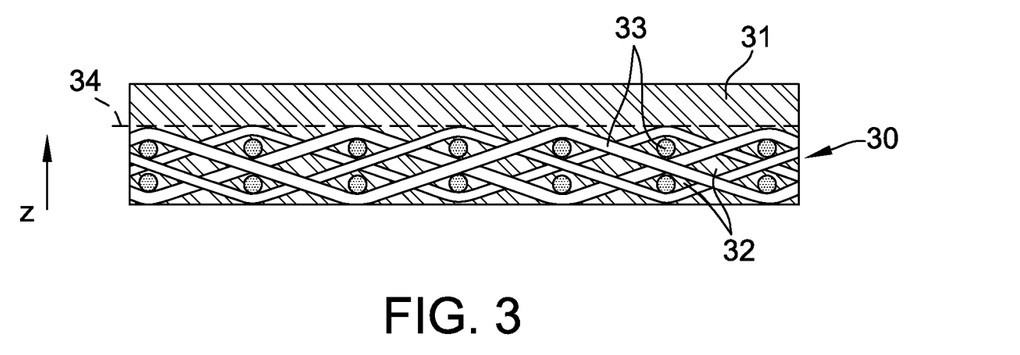
FIG. 3 is a cross-sectional view of a support structure of the present disclosure with a continuous platform layer thereon.

For instance, with reference to FIG. 3, depicted therein is a cross-sectional view of an exemplary woven support structure (30) with a platform layer (31) thereon. Platform layer (31) fills the voids (32) in support structure (30), surrounding the filaments (33) of the support structure. Platform layer (31) extends in a z direction above the top (34) of the support structure.

Although the support structures of the present disclosure are typically planar, the topography of the surfaces of the support structures may vary. This is illustrated, for example, in FIG. 2, which illustrates an exemplary support structure wherein the height to which filaments in the support structure extend in the z direction varies. In certain instances, it may be desirable to determine the highest point to which filaments in the support structure extend in the z direction (e.g., the highest point of the top surface), in order to ensure the extruder head is set at a sufficient height to produce a platform layer that extends above the top surface of the support structure. This point (i.e., the highest point of the top surface) is referred to herein as the "top" of the support structure.

Thus, in another aspect, the present disclosure is further directed to a method for determining a spatial relationship between the support structure (fabric) and the extruder head.

More particularly, the present disclosure is further directed to methods for identifying a top of the support structure (i.e., the highest point to which filaments in the support structure extend in the z direction). The top of the support structure can be identified by i) transporting the extrusion head over the top surface of the support structure in the x-y plane without contacting the support structure; and ii) while transporting the extrusion head over the top surface of the support structure, incrementally lowering the extrusion head in the z direction towards the top surface of the support structure until the filaments of the support structure begin to degrade (e.g., melt or otherwise show damage or degradation). In one embodiment, the extrusion head is transported over the top surface of the support structure without dispensing platform layer material. The point at which filaments of the support structure begin to degrade (e.g., melt, burn, or otherwise show damage or degradation) may be determined using any suitable means, including visually or microscopically. The extrusion head may be lowered towards the top surface of the support structure in any suitable increment. In one embodiment, the extrusion head may be lowered towards the top surface of the support structure in increments of 60 µm, 50 µm, 40 µm, 30 µm, 20 µm, 10 µm, 5 µm, 3 µm, 2 µm, or 1 µm until damage to the filaments is observed.

Once the top of the support structure is determined, the extrusion head may be set at a height above the top of the support structure prior to forming the platform layer. As discussed herein, this ensures the platform layer extends above the top surface of the support structure. The height of the extrusion head above the top of the support structure may vary. In certain embodiments, the height of the extrusion head is at least 0.01 mm, at least 0.05 mm, at least 0.07 mm, at least 0.1 mm, at least 0.15 mm, at least 0.17 mm, at least 0.2 mm, at least 0.25 mm, at least 0.27 mm, or at least 0.3 mm above the top of the support structure. In one particular embodiment, the height of the extrusion head is set to 0.2 mm above the top of the support structure.

Once the extruder head height has been selected, the maximum volumetric flow rate for the extruder at the selected height can be calculated. Maximum volumetric flow rate may be determined by the following process:
1) Set up the printer/extruder with the desired support structure and extrusion head set to the desired height.
2) Print a series of about 50 mm lines with a constant volume of extruded material per linear distance traveled ($cm^3$/cm), while increasing the travel speeds starting at a slow speed and incrementally increasing the speed (e.g., 600, 700, 800, 900, 1000, 1100, 1200, 1300, 1400, up to 1500 mm/min or higher).
3) Visually determine the highest speed that generates consistent extrusion.
4) Calculate maximum volumetric flow rate by multiplying the travel speed of the extrusion head by the volume of extruded material per linear distance traveled.

In one embodiment, the maximum volumetric flow rate for the extruder may be from about 0.01 to about 0.02 $cm^3$/second.

Once the maximum volumetric flow rate is determined, the extrusion volume (e.g., volume of platform layer material) dispensed onto the support structure per distance travelled by the extrusion head ("volume per linear distance") can be determined. The extrusion volume per linear distance travelled by the extruder head needed to achieve adequate adhesion of the platform layer material may be determined using the following procedure:
1) Print a series of patterns that exhibit 2 dimensional characteristics (e.g., circles, squares, or some other non-linear shape) onto the support structure. This allows adherence of the platform layer material to be tested in different directions of printing. Print each set of patterns with a different $cm^3$/cm value at the appropriate speed needed to maintain the calculated maximum volumetric flow rate at the selected extruder head height.
2) Subject the patterns to a platform adhesion test. This test may include, for example, bending the fabric at a severe radius, and mechanically attempting to pry the platform layer from the support structure.

An extrusion volume (e.g., volume of platform layer material) per distance travelled by the extrusion head ($cm^3$/cm) that balances the desired print speed and quality may then be chosen. Appropriate extrusion volume per distance travelled by the extrusion head may vary widely, depending on the extruder used and ultimate design of the 3D elements to be printed. In one embodiment, the volume per distance may be from about 0.02 to about 0.2 $cm^3$/cm.

The maximum linear speed at which the printer/extruder operates may be determined from the maximum volumetric flow rate at the selected height and the volume per linear distance. In certain embodiments, the platform layer is formed by transporting the extrusion head at a linear speed of from about 4 to about 40 $mm^3$/sec.

The platform layer may be formed over the entire surface area of the support structure (i.e., a continuous platform layer). Alternately, the platform layer may be formed at discrete locations on the support structure (i.e., a discontinuous platform layer). In one embodiment, the platform layer is formed in a pattern on the support structure. For example, the platform layer may be formed in a pattern corresponding to the desired pattern of the 3D element(s). In such embodiments, the platform layer may be formed such that the platform layer underlies the entirety of the 3D element(s) (i.e., underlies the entirety of the additional layer(s)). In other embodiments, the platform layer is formed such that the platform layer underlies only a part the 3D element(s) (i.e., only a part of the additional layer(s) contact the platform layer). For example, the platform layer may be formed at discrete locations under the 3D element(s). In such embodiments, because the platform layer is only present at certain locations on the support structure, some of the voids in the support structure remain open (i.e., at locations where the platform layer is not present), which allows for increased air permeability through the finished fabric. In such embodiments, the platform layer acts as an anchor to which the 3D element(s) is adhered to the support structure at discrete locations, while still allowing for air permeability through the fabric. In one embodiment, the platform layer is formed under (i.e., contacts) at least 10% of the surface area of the 3D element. In one embodiment, the platform layer is under from about 10% to about 50% of the surface area of the 3D element.

Figure 4:
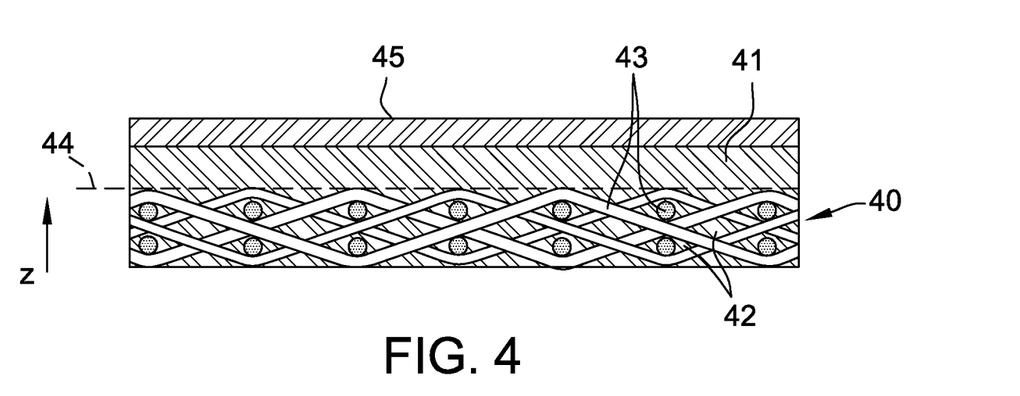
FIG. 4 is a cross-sectional view of a support structure of the present disclosure with a continuous platform layer thereon and an additional layer contacting the platform layer

With reference to FIG. 4, depicted therein is a cross-sectional view of an exemplary woven support structure (40) with a continuous platform layer (41) thereon. Platform layer (41) fills the voids (42) in support structure (40), surrounding the filaments (43) of the support structure. Platform layer (41) extends in a z direction above the top (44) of the support structure. On platform layer (41) is an additional layer (45), which is coextensive with platform layer (41). Additional layer (45) may be a single layer or may be multiple layers of FDM printed layers which form the 3D element(s) on the fabric.

Figure 5:
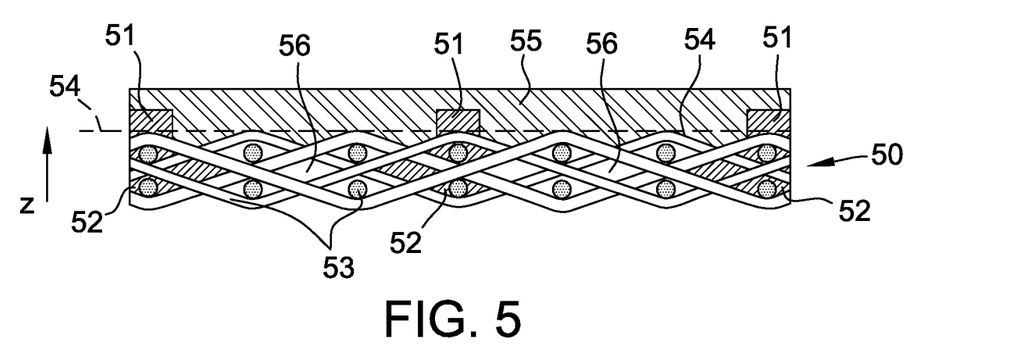
FIG. 5 is a cross-sectional view of a support structure of the present disclosure with a discontinuous platform layer thereon and an additional layer contacting the platform layer.

With reference to FIG. 5, depicted therein is a cross-sectional view of an exemplary woven support structure (50) with a discontinuous platform layer (51) thereon. Platform layer (51) fills the voids (52) in support structure (50), surrounding the filaments (53) of the support structure only at the locations where the platform layer is deposited. Voids (56) in sections of support structure (50) without platform layer (51) remain open, and are air permeable. Platform layer (51) extends in a z direction above the top (54) of the support structure. On platform layer (51) is an additional layer (55), which contacts platform layer (51) only in certain parts. Additional layer (55) may be a single layer or may be multiple layers of FDM printed layers which form the 3D element(s) on the fabric.

Additional Layers

Once the platform layer has been formed and solidifies, the 3D element(s) are formed by application of additional layer(s) to the support structure. The additional layer(s) as described herein may be a single layer, or more typically, may multiple layers of FDM printed layers which form the 3D element on the fabric. The additional layer(s) are formed on the support structure by transporting the extrusion head in the x and/or y direction over the top surface of the support structure to form the desired pattern, while dispensing an additional flowable material. Elevation is provided to the 3D elements by incrementally transporting the extrusion head in the z direction away from the top surface of the support structure. As discussed herein, at least a portion of the additional layer(s) contact the platform layer. The material used to form the additional layer(s) may be the same or different than the platform layer material. In one embodiment, the additional layer(s) and platform layer are formed from the same material. In one embodiment, the additional layer(s) and platform layer are formed from the same material and the extrusion head used to form the platform layer is also used to form the additional layer(s).

The 3D elements of the present disclosure (including in some instances the platform layer) are generally formed by depositing a polymeric material on the support structure (or on the support structure and/or platform layer in the case of the additional layer(s)) in any suitable manner. Thus in certain embodiments elements are formed by extruding, such as that disclosed in U.S. Pat. No. 5,939,008, the contents of which are incorporated herein by reference in a manner consistent with the present disclosure, or printing, such as that disclosed in U.S. Pat. No. 5,204,055, the contents of which are incorporated herein by reference in a manner consistent with the present disclosure, a polymeric material onto the support structure. In other embodiments the 3D element(s) may be produced, at least in some regions, by extruding or printing two or more polymeric materials.

In one embodiment the 3D element(s) are formed using SFF or layer manufacturing (LM) techniques, such as 3D printing techniques described in U.S. Pat. No. 5,204,055. Generally, 3D printing techniques may be employed to form an element from a series of layers of material with each layer printed and formed on top of the previous layer.

Three-dimensional printing of the elements generally begins with creating a computer model of the element in three dimensions using a suitable computer modeling program known in the art. The computer model of the element is completely sectioned into a series of horizontal digital slices to define a set of slice patterns for each layer.

In one embodiment the 3D elements may be formed using one or more printheads that span at least a portion of the width of the support structure. The printheads (also referred to herein as extrusion heads) may be moveable so as to print materials onto a static support structure, or the support structure may be moved and the printheads may be fixed. Regardless, it is generally preferred that the moving object be moved at a substantially constant speed in a flat plane. In one particularly preferred embodiment a plurality of printheads extend across the width of the belt, which is moved in a flat plane during printing, perpendicular to the direction of travel of the support structure and are, preferably, spaced along the support structure with substantially constant separations. However, constant separation of the printheads is not critical.

The printheads print one layer of an element onto the previously printed layer. Thus the first printhead prints the first layer, the second printhead prints a second layer onto the first layer and the Nth printhead prints an Nth layer onto the (n−1)th layer. The printhead used to print the additional layers may be the same or different than what is used to dispense the platform layer material. In one embodiment, the printhead used to print the additional layer(s) is the same as the printhead used to dispense the platform layer material.

The layers are of a constant thickness and the printheads are controlled so that, in plane view, layers are printed on top of each other. The distance from each of the printheads to the surface upon which they print is also preferably the same for all printheads. Thus the distance from the first printhead to the substrate is preferably the same as the distance from the seventh printhead to the sixth layer. This may be achieved by sequentially raising the printhead(s) for each layer by the voxel height. In this situation, droplets ejected by printheads for different layers at exactly the same time will arrive at their destinations at the same time.

In certain embodiments the 3D element(s) may be formed with an aperture. The apertures generally function as fluid passageways or for other purposes and remain ' empty' of printed or inserted materials in the finished product. It will be appreciated that the aperture may vary in shape and may include squares, rectangles, ovals and circles, and polygons having an odd number of sides. The apertures may be the same or different shapes and may be the same or different size. In particularly preferred embodiments an aperture is disposed on at least two different surfaces of an element and the apertures are connected to one another by a continuous channel. The continuous channel places the pair of apertures in communication with one another and creates a passageway through the element.

The printing system may comprise a means for moving the support structure as it is printed. Preferably the support structure is moved at a substantially constant velocity in a flat plane. The support structure may be directly driven or may be located on a conveyor system.

The materials printed by the printheads (and used to form the additional layer(s)) may include photo-curable and self-curing resins. Photocurable resins may include resins curable by UV curing, visible light curing, electron beam curing, gamma radiation curing, radiofrequency curing, microwave curing, infrared curing, or other known curing methods involving application of radiation to cure a resin. Suitable resins may also include those that may be cured via chemical reaction without the need for added radiation as in the curing of an epoxy resin, extrusion of an autocuring polymer such as polyurethane mixture, thermal curing, solidifying of an applied hotmelt or molten thermoplastic.

In certain embodiments the polymeric material may comprise PET (polyester), PPS (polyphenylene sulfide), PCTA (poly 1,4 cyclohexane dimethylene terephthalate), PEN (polyethylene naphthalate), PVDF (polyvinylidene fluoride) or PEEK (polyetheretherketone), either alone or in combination. Generally, such materials are capable of withstanding continuous service up to 500° F. in the presence of air and water vapor.

In other embodiments the polymeric material comprises a thermoplastics such as, for example, a thermoplastic comprising from about 0.5 and 10 weight percent silicone and a base polymer selected from the group consisting of polyethersulfones, polyetherimides, polyphenylsulfones, polyphenylenes, polycarbonates, high-impact polystyrenes, polysulfones, polystyrenes, acrylics, amorphous polyamides, polyesters, nylons, PEEK, PEAK and ABS.

In still other embodiments the materials may comprise a polymeric material having a viscosity greater than 70,000 Centipoise (cP) and preferably in a range from about 100,000 to about 150,000 cP, measured according to ASTM D790-10 at 120° C. In certain preferred embodiments the polymer material comprises at least one of a polyurethane, a silicone, or a polyureas and has a viscosity from about 120,000 to about 140,000 cP.

In one preferred embodiment, the additional layer(s) are formed by an LM method comprising an extrusion head that extrudes heated, flowable modeling material from a nozzle onto the support structure. The extruded material is deposited layer-by-layer in areas defined from a CAD model, as the extrusion head and the support structure are moved relative to each other in three dimensions by an x-y-z gantry system. The material solidifies after it is deposited to form a three-dimensional element. The material may be a thermoplastic material which solidifies after deposition by cooling. The platform layer material may similarly be deposited in areas defined from a CAD model along the lines discussed herein.

Extrusion heads and systems suitable for preparing three-dimensional elements as described above are commercially available from Stratasys® modeling machines. The extrusion head, which includes a liquifier and a dispensing nozzle, receives modeling material in a solid form. The filament is heated to a flowable temperature inside the liquifier and it is then dispensed through the nozzle. Thermoplastic materials, particularly ABS thermoplastic, have been found particularly suitable for deposition modeling in the Stratasys® modeling machines. A controller controls movement of the extrusion head in a horizontal x, y plane, controls movement of the build platform in a vertical z-direction, and controls the feeding of modeling material into the head. By controlling these processing variables, the modeling material is deposited at a desired flow rate in "beads" or "roads" layer-by-layer in areas defined from the CAD model to create a three-dimensional object that resembles the CAD model. The modeling material thermally solidifies, and the finished model is removed from the substrate.

Having now described the present disclosure with references to the attached figures, it will be appreciated that in a first embodiment the present disclosure provides a method of additively manufacturing a fabric, the method comprising: providing a support structure having a top surface, a bottom surface opposite to the top surface, an x-y plane, and a thickness extending from the bottom surface to the top surface in a z-direction perpendicular to the x-y plane, the support structure comprising a plurality of filaments and voids between the filaments; forming a first platform layer on the support structure by dispensing onto the top surface of the support structure a flowable platform layer material from an extrusion head transported in the x and/or y directions over the top surface of the support structure, wherein at least a portion of the voids are filled with the flowable platform layer material; and forming at least one additional layer on the support structure by incrementally transporting the extrusion head in the z direction away from the top surface of the support structure, wherein at least a portion of the at least one additional layer contacts the first platform layer.

In another embodiment, the present disclosure provides a method of identifying a top of the support structure by: i) transporting an extrusion head over the top surface of a support structure in the x-y plane without contacting the support structure; and ii) while transporting the extrusion head over the top surface of the support structure, incrementally lowering the extrusion head in the z direction towards the top surface of the support structure until the filaments of the support structure begin to degrade.

In another embodiment, the present disclosure provides a fabric manufactured by the methods of the present disclosure.

In another embodiment, the present disclosure provides a fabric comprising a support structure having a top surface, a bottom surface opposite to the top surface, an x-y plane, and a thickness extending from the bottom surface to the top surface in a z-direction perpendicular to the x-y plane, the support structure comprising a plurality of filaments and voids between the filaments; a discontinuous platform layer comprising a platform layer material on the top surface of the support structure, wherein at least a portion of the voids are filled with the platform layer material; and at least one additional layer; wherein at least a portion of the at least one additional layer contacts the platform layer.

As discussed herein, the methods of the present disclosure provide a new technique for printing 3D elements on fabrics. In particular, the methods of the present disclosure produce a platform layer using intercalation, on a fabric support structure. Advantageously, The platform layer of the current disclosure may be rapidly formed, and does not melt, burn, or otherwise damage the support structure upon which it is printed. The platform layer produced by the methods of the present disclosure further provides a surface upon which additional layers of 3D elements may adhere. In one embodiment, the force required to remove the platform layer from the support structure may be, for example, between 0 and 1,200 $g/mm^2$.

Thus, in another aspect, the present disclosure provides fabrics with a three-dimensional element thereon, wherein the fabric comprises a support structure having a top surface, a bottom surface opposite to the top surface, an x-y plane, and a thickness extending from the bottom surface to the top surface in a z-direction perpendicular to the x-y plane, the support structure comprising a plurality of filaments and voids between the filaments; a platform layer on the top surface of the support structure, wherein at least a portion of the voids are filled with the platform layer; and at least one additional layer, wherein the at least a portion of the at least one additional layer contacts the platform layer. In one embodiment, the filaments of the support structure are not damaged (e.g., melted or degraded).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of additively manufacturing a fabric, the method comprising:
   providing a support structure having a top surface, a bottom surface opposite to the top surface, an x-y plane, and a thickness extending from the bottom surface to the top surface in a z-direction perpendicular to the x-y plane, the support structure comprising a plurality of filaments and voids between the filaments;
   placing the support structure on a support plate or belt;
   heating the support structure by heating the support plate or belt;
   forming a platform layer on the support structure, while the support structure is heated, by dispensing onto the top surface of the support structure a flowable platform layer material from an extrusion head transported in the x and/or y directions over the top surface of the support structure, wherein the flowable platform layer has a viscosity greater than 70,000 Centipoise (Cp) to allow the flowable platform layer material to flow into the voids of the support structure; and
   forming at least one additional layer on the support structure by incrementally transporting the extrusion head in the z direction away from the top surface of the heated support structure, wherein at least a portion of the at least one additional layer contacts the platform layer.

2. The method of claim 1, wherein the platform layer is continuous.

3. The method of claim 1, wherein the platform layer is discontinuous.

4. The method of claim 1, wherein the extrusion head does not contact the top surface of the support structure when forming the platform layer.

5. The method of claim 1, wherein the platform layer extends in the z direction above the top surface of the support structure.

6. The method of claim 1, wherein the support structure is a woven fabric.

7. The method of claim 1, wherein the support structure comprises polyphenylene sulfide.

8. The method of claim 1, wherein the flowable platform layer material is selected from the group consisting of polyphenylene sulfide, polyester, poly 1,4-cyclohexane dimethylene terephthalate, polyethylene naphthalate, polyvinylidene fluoride, polyetheretherketone, and combinations thereof.

9. The method of claim 8, wherein the flowable platform layer material comprises polyphenylene sulfide.

10. The method of claim 1, wherein the flowable platform layer material penetrates to at least 50% of the thickness of the support structure.

11. The method of claim 1, wherein the support structure is heated to a temperature of at least 70° C.

12. The method of claim 1, wherein the platform layer contacts at least 10% of a surface area of the additional layer(s).

13. The method of claim 1, further comprising:
   a) identifying a top of the support structure by:
      i) transporting the extrusion head over the top surface of the support structure in the x-y plane without contacting the support structure; and
      ii) while transporting the extrusion head over the top surface of the support structure, incrementally lowering the extrusion head in the z direction towards the top surface of the support structure until the filaments of the support structure begin to degrade; and
   b) setting the extrusion head to a height above the top of the support structure prior to forming the first platform layer.

14. The method of claim 13, wherein the extrusion head is lowered in 50 μm increments.

15. The method of claim 13, wherein the height of the extrusion head is 0.2 mm above the top of the support structure.

16. The method of claim 1, wherein the flowable platform layer material is dispensed from the extrusion head at a volume per linear distance of from about 0.02 to about 0.2 $cm_3/cm$.

17. The method of claim 1, wherein the platform layer is formed by transporting the extrusion head at a linear speed of from about 4 to about 40 $mm_3/sec$.

18. The method of claim 1, wherein the viscosity of the flowable platform layer has a range from about 100,000 Cp to about 150,000 Cp.

* * * * *